C. H. HARNDEN.
REIN GUARD.
APPLICATION FILED JAN. 9, 1919.
1,321,431.
Patented Nov. 11, 1919.
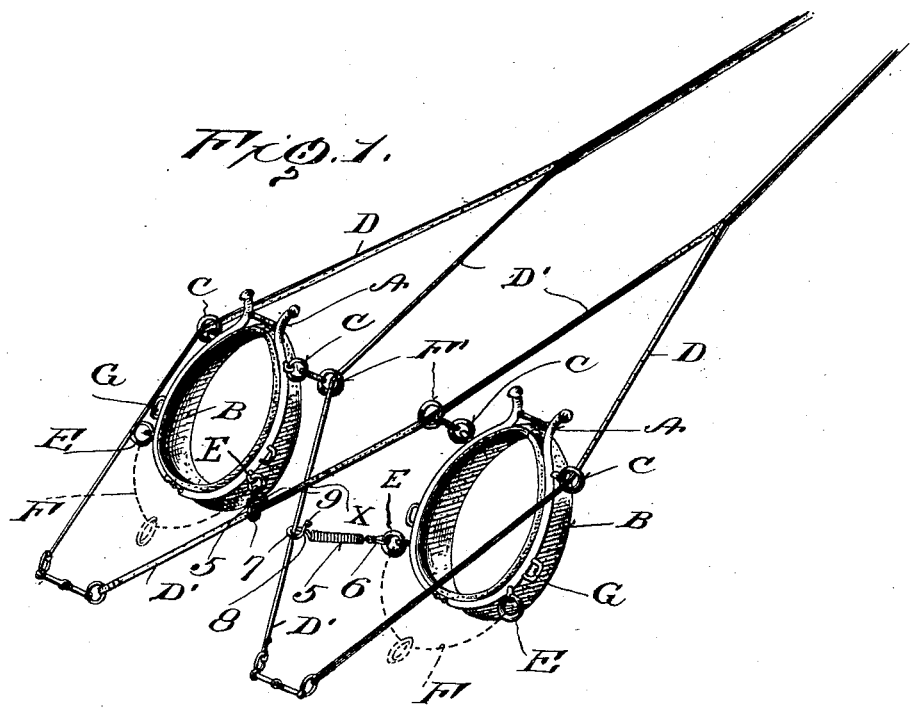
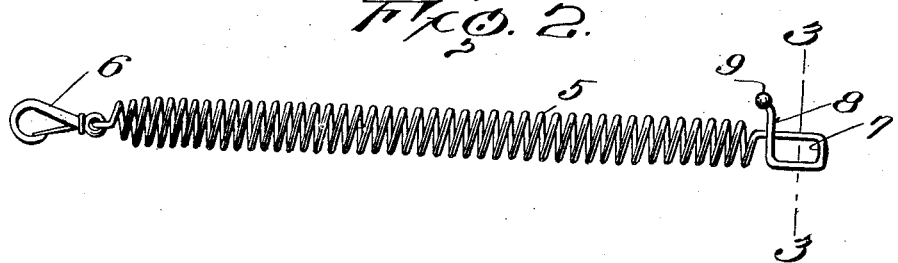
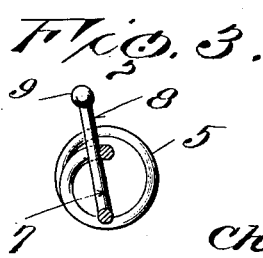
Inventor
Charles H. Harnden
By
Attorneys

UNITED STATES PATENT OFFICE.

CHARLES H. HARNDEN, OF HUDSON, WISCONSIN.

REIN-GUARD.

1,321,431.  Specification of Letters Patent.  Patented Nov. 11, 1919.

Application filed January 9, 1919. Serial No. 270,298.

*To all whom it may concern:*

Be it known that I, CHARLES H. HARNDEN, a citizen of the United States, residing at Hudson, in the county of Saint Croix, State of Wisconsin, have invented certain new and useful Improvements in Rein-Guards; and I do hereby declare the following to be a full, clear, and exact description of the invention, such as will enable others skilled in the art to which it appertains to make and use the same.

The invention relates to a harness attachment, and more particularly to the class of rein guards.

The primary object of the invention is the provision of a guard of this character, wherein the driving reins of harness will be properly held when draft animals are hitched to a pole or tongue of a wagon or the like, so as to avoid the possibility of the reins being caught beneath the pole or tongue or becoming entangled therewith.

Another object of the invention is, the provision of a guard of this character, wherein the same can be readily and conveniently hung upon the hames of the harness and will permit engagement of the driving reins therein or removal therefrom quickly, so that the same will be properly supported and in this manner the guard can be interchanged from one set of harness to another with despatch, the reins being readily handled so as not to interfere with the driving of the draft animals, and will avoid any possibility of the reins engaging with the pole or yoke.

A further object of the invention is, the provision of a guard of this character, which is extremely simple in construction, thoroughly reliable and efficient in its purpose, strong, durable and inexpensive to manufacture.

With these and other objects in view, the invention consists in the features of construction, combination and arrangements of parts as will be hereinafter fully described, illustrated in the accompanying drawing and pointed out in the claims hereunto appended.

In the accompanying drawing:

Figure 1 is a perspective view of a portion of a double harness provided with the rein guards constructed in accordance with the invention, showing the reins engaged therewith.

Fig. 2 is an enlarged view of one of the guards, and

Fig. 3, is a fragmentary sectional view of one of the attaching ends of one guard showing in detail the said end.

Similar reference characters indicate corresponding parts throughout the several views in the drawing.

Referring to the drawings in detail, A designates a pair of opposed hames of a double harness, the same being in position as occupied when upon the draft animals when harnessed in a pair, and these hames are adapted to receive the usual collars B. Each of the hames carries the opposed upper pair of eyes C and each outside eye is adapted to have trained therethrough, the outside branch D of a pair of driving lines or reins, while the inside eyes are adapted to receive directly or through the medium of spreaders F', the inside branches D' of said lines or reins. It is to be understood that these spreaders are adapted to serve the usual function of holding the inside reins in close proximity to each other, while at the same time holding them away from the collars and hames.

The lower rings for connection of the breast straps are designated at E, the breast straps being also connected to opposite sides at rings E and indicated at F, while also being adapted for connection with the neck yoke or breast bar in the usual manner. The trace loops carried by the hames are designated at G and are located above the rings E. To the lowermost inner rings E, the rein guards constituting the invention, are attached beyond the crossing point X of the reins.

In practice, a pair of guards is employed and it is thought that a detailed description of one will suffice, both being the same in construction and each comprises a coiled retractile spring 5 which is of the required length and the convolutions or coils of this spring throughout its length are uniform, while at one end of the spring is mounted thereon or integrally formed therewith, a snap hook fastener 6 for detachable engagement with the lower inside eyes or rings E on the hames A. At the opposite end of the spring 5 is formed into an eye or open loop 7 having the extremity 8 of said spring at its loop and straight and crossing the body of the loop 7 so that the latter is closed and this straight extremity 8 possesses the requisite resiliency to sustain the loop closed yet it will permit the detachable insertion of the branches D' of the lines or reins therein, as is clearly shown in Fig. 1, of the drawings, which branches D' freely slide through the loops 7 in the driving of the draft animals. The extremity 8 at its free terminal is formed with a ball head 9 so as to avoid injury to the animal should this extremity 8 contact therewith.

In the use of the pair of guards, the inner branches D' of the lines or reins cannot engage with the pole or breast bar, to which the draft animals are hitched, while at the same time, these branches are yieldably supported to permit the reins to give the correct pull upon the bits when the occasion requires, and also allows the animals to have proper and free movement of their heads. It will be clearly apparent that the branches D' will be properly supported in close relation with the collars and the reins can be handled in the usual manner for the driving of the animals.

Attention is also called to the fact that each guard is connected to a hame and slidably receives therein, the inner rein from the opposite horse or other draft animal, beyond where the inner branches cross each other, thus supporting the reins about midway between the hame or spreader rings at the free ends of the spreaders F' and the bits, thereby avoiding any possibility of the reins catching in the draft pole or neck yoke, at the extremities of the latter. Thus, it will be seen that the device is entirely distinct from the usual spreader construction and the functions served thereby, especially in view of its connection to the lower rings of the hames at the inside, instead of to the upper rings or eyes of the hames at the inside. It should also be noted that, the springs or resilient elements 5, constituting the guards proper, extend downwardly toward each other in convergent relation, thereby giving support to the inner branches of the reins, as well as holding them away from the animals and therefore, the hames.

What is claimed is:—

1. The combination with opposed hames of a harness having upper and lower eyes at the inside thereof, the upper eyes being designed to receive the inside reins, beyond which said reins are disposed in crossed relation; of guard members connected to the lower eyes and receiving the reins therethrough beyond their point of crossing.

2. The combination with opposed hames of a harness having upper and lower eyes at the inside thereof, the upper eyes being designed to receive the inside reins, beyond which said reins are disposed in crossed relation; of guard members adapted to receive and support the reins beyond their point of crossing, said guard members comprising resilient members adapted for expansion and contraction and provided with means to detachably engage the lower eyes, at one end of each, and an open loop at the opposite end of each to permit lateral displacement of a rein into or from the loop of each guard member, as and for the purposes specified.

3. In a double harness, adapted for use with a draft pole of a vehicle having a neck yoke, comprising inner and outer reins, said inner reins being disposed in crossed relation, collars, hames on said collars, said hames having each spaced upper and lower, inner and outer eyes, the upper eyes being designed to support the reins and the lower eyes being adapted for connection with the traces and breast straps, and guards having contractile springs detachably connected to the lower inner eyes and movably and detachably receiving the reins therethrough beyond the point of crossing and about midway between the upper eyes and the point of connection of the reins with the horses' bits.

4. The combination with a harness including opposed hames having upper and lower hame rings at the inner and outer sides thereof, the uppermost outer rings being designed to receive the outer reins and the lowermost outer rings being designed to attach to the breast straps as well as the lowermost inner rings being also designed to connect to the breast straps, spreaders connected to the uppermost inner hame rings and having loops at the ends thereof designed to receive the inner reins, said inner reins being disposed in crossed relation beyond said loops; of guards comprising retractile springs having snap hooks engageable detachably with the lowermost inner rings and having the opposite ends thereof looped with the free extremities crossing the loops and pressing resiliently against the same to slidably receive detachably therein, the reins beyond the point of crossing.

In testimony whereof, I affix my signature, in the presence of two witnesses.

CHARLES H. HARNDEN.

Witnesses:
 B. C. BUNKER,
 CLAY C. HARNDEN.